(12) United States Patent
Chou et al.

(10) Patent No.: US 6,914,861 B2
(45) Date of Patent: Jul. 5, 2005

(54) DEFECT PROTECTING CIRCUIT AND A METHOD FOR DATA SLICER IN AN OPTICAL DRIVE

(75) Inventors: Sue-Hong Chou, Taipei (TW); Yi-Lin Lai, Keelung (TW)

(73) Assignee: Via Technologies Inc. (TW)

( * ) Notice: Subject to any disclaimer, the term of this patent is extended or adjusted under 35 U.S.C. 154(b) by 258 days.

(21) Appl. No.: 10/012,645

(22) Filed: Nov. 13, 2001

(65) Prior Publication Data

US 2002/0080694 A1 Jun. 27, 2002

(30) Foreign Application Priority Data

Nov. 21, 2000 (TW) ........................................ 89124601 A

(51) Int. Cl.[7] ................................................. G11B 7/00
(52) U.S. Cl. ............................. 369/47.26; 369/47.35; 369/59.16
(58) Field of Search ........................... 369/47.26, 47.35, 369/59.16, 47.14, 47.25, 53.15, 59.15, 59.17

(56) References Cited

U.S. PATENT DOCUMENTS

| | | | | |
|---|---|---|---|---|
| 4,703,468 A | * | 10/1987 | Baba et al. | 369/44.32 |
| 4,722,079 A | * | 1/1988 | Matsumoto | 369/44.32 |
| 5,124,964 A | * | 6/1992 | Hayashi | 369/44.11 |
| 5,241,220 A | * | 8/1993 | Karlock | 327/237 |
| 5,600,615 A | * | 2/1997 | Kiyoura et al. | 369/44.35 |
| 6,137,758 A | * | 10/2000 | Nemoto | 369/44.29 |
| 6,341,113 B1 | * | 1/2002 | Kamiyama | 369/53.15 |

* cited by examiner

*Primary Examiner*—Gautam R. Patel

(57) ABSTRACT

A defect protecting circuit and a method for data slicer in an optical drive is disclosed. As a defect occurs in a disk, the gain of the data slicer is switched to a high gain. After the defect does not occur further, the gain is switched back to a normal gain. Therefore the slicing level can return back to a correct slicing level for reducing incorrect data after the defect terminates, and the jitter in the output data is also reduced.

7 Claims, 4 Drawing Sheets

DEFECT PROTECTING CIRCUIT AND A METHOD FOR DATA SLICER IN AN OPTICAL DRIVE

FIELD OF THE INVENTION

The present invention relates to a defect protecting circuit and a method for data slicer by switching between a high gain and a normal gain, so that the incorrect data number may be reduced after occurring defect.

BACKGROUND OF THE INVENTION

Due to progress in photoelectric technology, digital audio and video technology can be used to acquire a high quality image and sound effects. Therefore, DVD (digital versatile disk) drives are nowadays widely used. Currently, when defect in the compact disk is detected, the data slicer in the DVD drive is still in the normal gain. As a result, when the defect comes to an end, the data slicer can not chase to a correct slicing level so that the time period of data fault can not be reduced effectively. Therefore, the above mentioned technology is highly needed to be improved.

For the data slicer technology, one of the prior art is illustrated in FIG. 1. In FIG. 1, a comparator 40 compares the signals XI4 with VC4, and outputs a signal XC4. Then the comparator is connected to a digital sum value (DSV) calculator 42 for further processing and then a DSV signal is outputted. The DSV signal is then sent to a DSV processor 44 for data slicing.

The DSV processor 44 includes a filtering unit 45 for filtering the DSV signal. The DSV processor 44 generates a digital correcting signal, which is sent to a digital/analog converter 48 for being converted into an analog signal VC4. The VC4 is used to adjust the reference slicing level of the data slicer. Then it is connected to an input of the comparator. As a result, a digital data slicer is accomplished.

Different from the prior art, in the present invention, an analog data slicer is disclosed. Through the adjustment of gains, the time period of data fault is reduced after a defect occurs.

SUMMARY OF THE INVENTION

Accordingly, the primary object of the present invention is to provide a defect protecting circuit and a method for data slicer. When a defect occurs in a compact disk, the data slicer is switched from a mode of normal gain into a mode of high gain. After the defect does not occur further, the operation mode is switched back to a normal gain. Therefore, after the defect does not occur further, the slicing level can rapidly return back to a correct slicing level for reducing incorrect data caused by the defect, and the jitter in the output data is also reduced.

To achieve above objects, the present invention provides a defect protecting circuit and a method for data slicer. When a defect is detected, through the operation and comparing of the gain control logic circuit, a gain select signal is generated to switch gain of the data slicer so that a proper slicing level is acquired. When the defect terminates, then the data slicer will return back to a correct data slicer rapidly for reducing the jitter of the outputting data.

Preferably, the defect protecting circuit of a data slicer includes a defect detecting circuit, a gain control logic circuit, a high pass filter, a comparator, an analog slicer current pump circuit, and a low pass filter. The defect detecting circuit serves for detecting a defect occurring in a compact disk and then outputting a defect signal. The gain control logic circuit serves for receiving the defect signal, and then outputting a gain select signal. The high pass filter serves for receiving a reference voltage and a RF signal; and then outputting a high-pass filtered RF signal. The comparator serves for receiving the high-pass filtered RF signal and a signal level and then outputting a modulation signal. The analog slicer current pump circuit serves for receiving the modulation signal and the gain select signal and then outputting a current pump signal. The low pass filter is used for filtering the current pump signal and then outputting the signal level to the comparator.

Preferably, the gain control logic circuit includes a gain select circuit and a counter. The gain control circuit serves for receiving the defect signal and outputting the gain select signal. When the data slicer switches to a normal gain, the counter counts based on the defect signal and an external reference voltage.

Preferably, the high pass frequency selection circuit includes an RF signal receiver, a high pass frequency selection circuit, and a disk signal selection circuit. The RF signal receiver serves for receiving the RF signal. The high pass frequency selection circuit serves for receiving the reference voltage and outputting a reference value with respect to the reference voltage. The disk signal selection circuit serves for receiving an output from the RF signal receiver and the reference value, and outputting the high-pass filtered RF signal to the comparator.

Preferably, in the defect protecting method of a data slicer, when data is read from a compact disk and a defect occurs, the data slicer enters into a gain adjusting mode. When the defect terminates, the data slicer is out of the gain adjusting mode. In the gain adjusting mode, the gain of the data slicer is adjusted higher than that under no defect. When the defect terminates, the slicing level is rapidly restored to a correct slicing level.

The various objects and advantages of the present invention will be more readily understood from the following detailed description when read in conjunction with the appended drawing.

DETAILED DESCRIPTION OF THE PREFERRED EMBODIMENTS

The present invention relates to a defect protecting circuit and a method for data slicer. In the present invention, when a defect of the compact disk is detected, a gain adjusting mode is used for switching from a normal gain to a high gain. Then, after the defect terminates, the gain is switched back to the normal gain. Therefore, the slicing level of the data slicer can come back to the correct slicing level rapidly for reducing the number of incorrect data after defect occurring and the jitter in the output data is also reduced.

Figure 1:
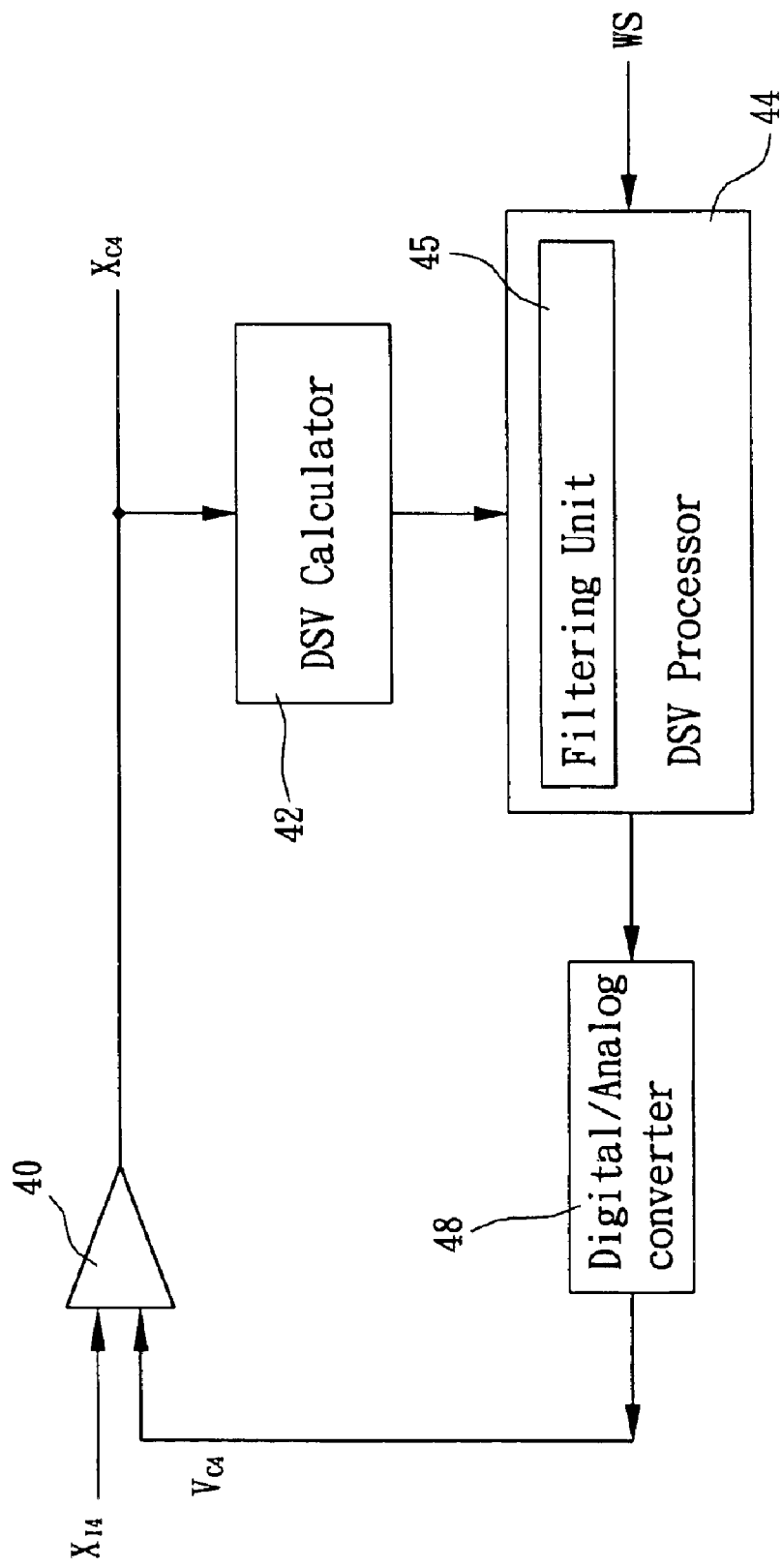
FIG. 1 is a circuit block diagram of a prior art digital slicer.
Figure 2:
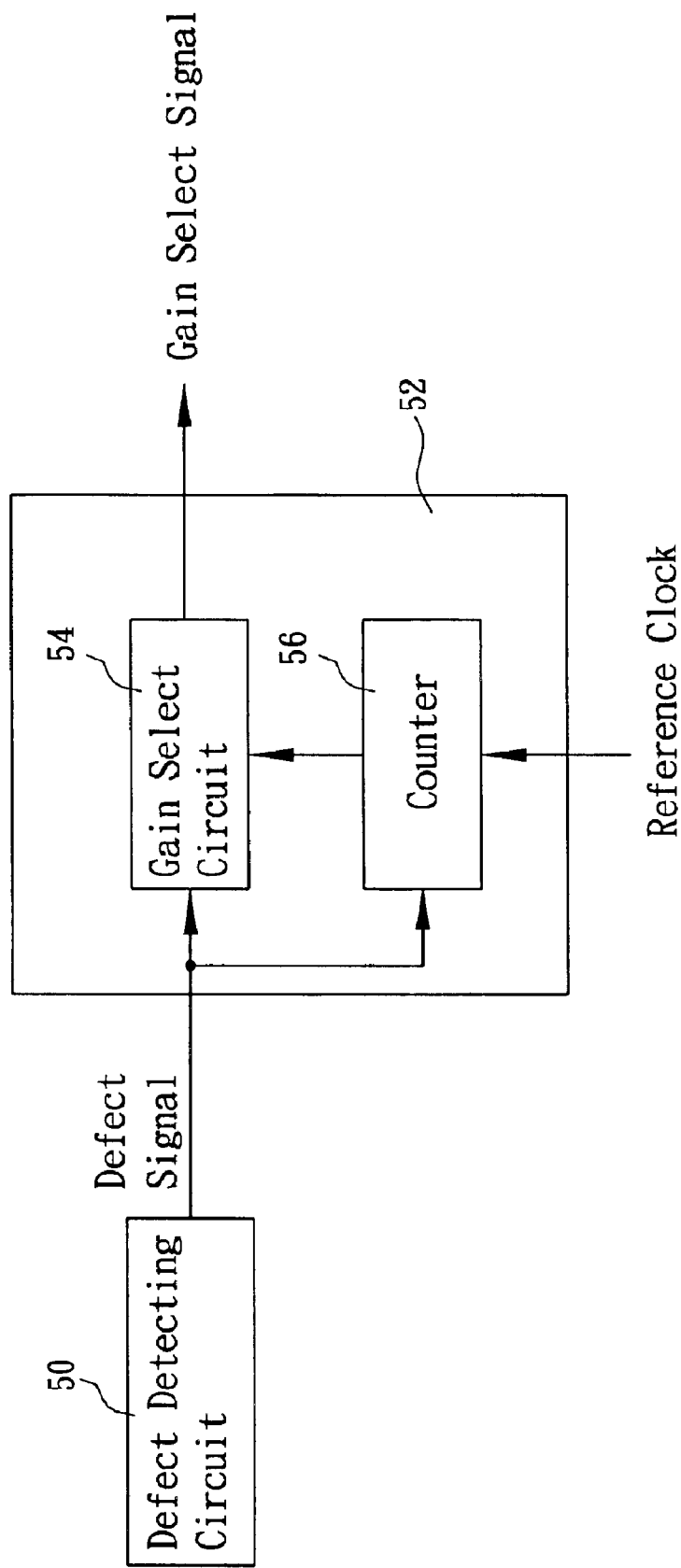
FIG. 2 is a circuit block diagrams of the defect detection and gain control logic circuit of the invention.

Referring to FIG. 2, which shows the block diagrams of the defect detection and gain control logic circuit. A defect detecting circuit 50 is connected to a gain control logic circuit 52. The gain control logic circuit 52 includes a gain select circuit 54 and a counter 56. The defect detecting circuit 50 serves to detect any defect existed in the compact disk. The input of the gain control logic circuit 52 is connected to the output of the defect detecting circuit 50. The output of the defect detecting circuit 50 outputs a gain select signal for gain switching as defect occurs. In the gain select circuit 54, the gain is switched properly according to the defects detected by the defect detecting circuit 50. The counter 56 receives an output of the defect detecting circuit 50 and an external reference clock for providing the desired time point in gain switching of the gain select circuit 54. The detail action will be described in the following.

When the defect detecting circuit 50 detects a defect, a defect signal is outputted. In this preferred embodiment, it is assumed that the defect signal is in high level, when the defect of a compact disk is detected. When the gain control logic circuit 52 accepts the defect signal, a proper gain switching operation is performed to switch from the current normal gain to a high gain. Since the gain increase makes the slicer (not shown) in a higher bandwidth, a correct slice level is rapidly acquired. When the defect comes to an end, a high pass circuit (shown in FIG. 3), placed at prior stage of the slicer, makes the input signal have a differentiate effect and thus the slicing level is also changed greatly. Now, the slicer circuit is still in a high gain condition. Therefore, a correct slicing level is obtained rapidly. However, since high gain will cause a greater jitter, the gain is switched to the normal gain after a predetermined time counted by the counter 56.

Figure 3:
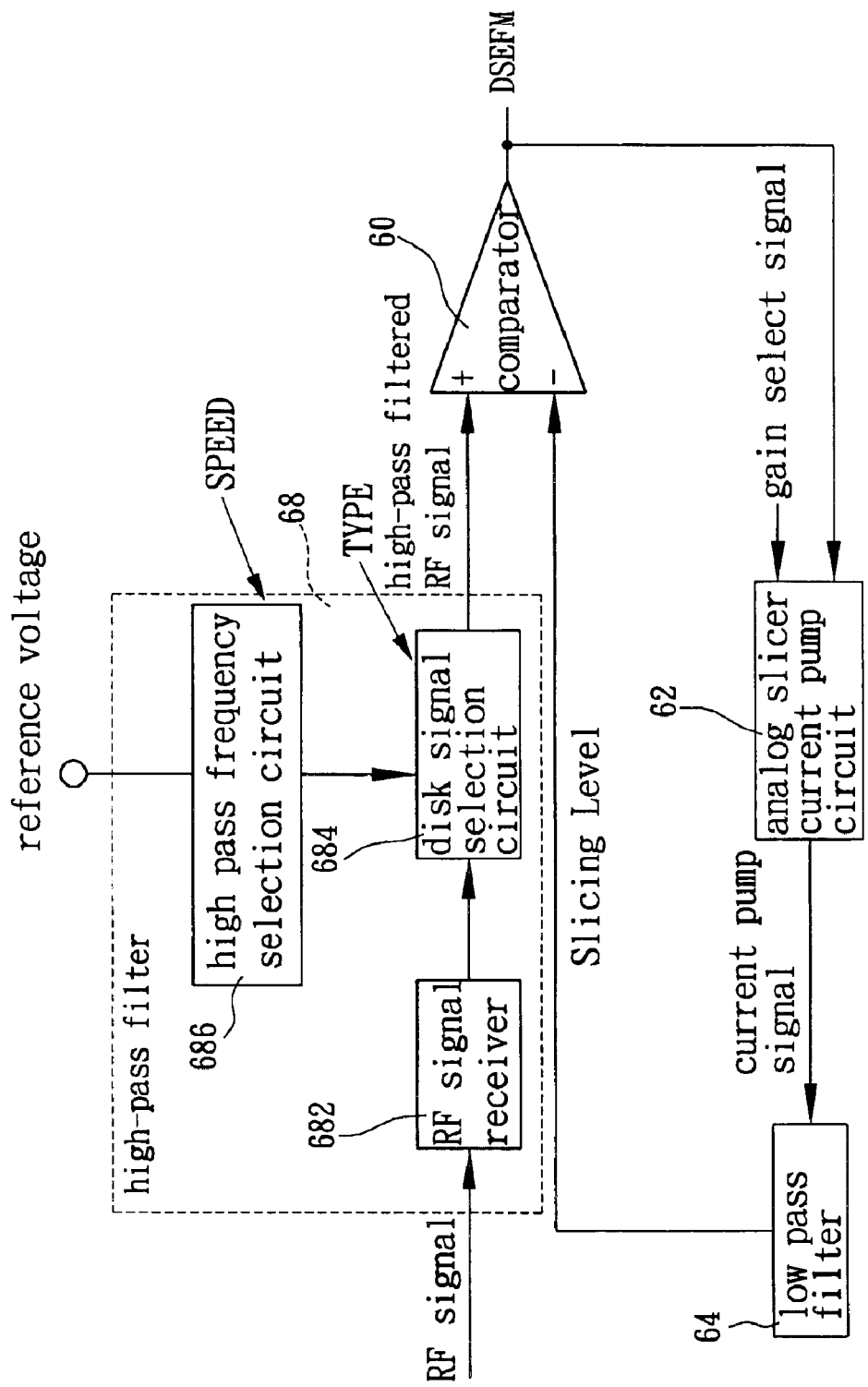
FIG. 3 shows the circuit block diagram according to a preferred embodiment of the gain selection of the slicing level.

A preferred embodiment about a defect protecting circuit for compact disk data slicer is illustrated in FIG. 3. In this embodiment, the defect protecting circuit mainly includes a comparator 60. The comparator 60 compares a filtered radio frequency (RF) signal from a high pass filter 68 with the slicing level of the data slicer, and then outputs a data slicer eight to fourteen modulation (DSEFM) signal. The DSEFM signal is fed back to a connected analog slicer current pump 62. The analog slicer current pump 62 further receives a gain select signal outputted from the gain control logic circuit 52. The gain select signal is used for selecting a normal gain or a high gain. The analog slicer current pump 62 outputs a current pump signal to a low pass filter 64. The low pass filter 64 is used for filtering the current pump signal. Then, a slicing level of a RF signal is outputted and sent to an input (for example, an inverting input) of the comparator 60.

Therefore, a negative feedback path is formed by elements 60, 62 and 64. By the gain select signal, when a defect occurs, the gain is switched to a high gain. Therefore, the slicing level can be rapidly switched to a correct slicing level after the defect terminates. After a preset time is elapsed, the slicing level is switched back to the normal gain for avoiding the unsteadiness of the output data.

Besides, the high pass filter 68 illustrated in FIG. 3 receives an external RF signal and a reference voltage, and filters the RF signal according to the reference voltage for outputting a high pass filtered RF signal to the comparator 60. The high pass filter 68 includes a RF signal receiver 682, a disk signal selection circuit 684, and a high pass frequency selection circuit 686. In the high pass frequency selection circuit 684, different values are provided for the reference value of the slicing level to be selected. Furthermore, the output of the high pass frequency selection circuit 686 is connected to the disk signal selection circuit 684. Moreover, the RF signal receiver 682 serves to receive the RF signal and then further processes the received RF signal. The output of the RF signal receiver 682 is connected to the disk signal selection circuit 684 for selecting RF input signals of various disk formats for example, CD or DVD.

Figure 4:
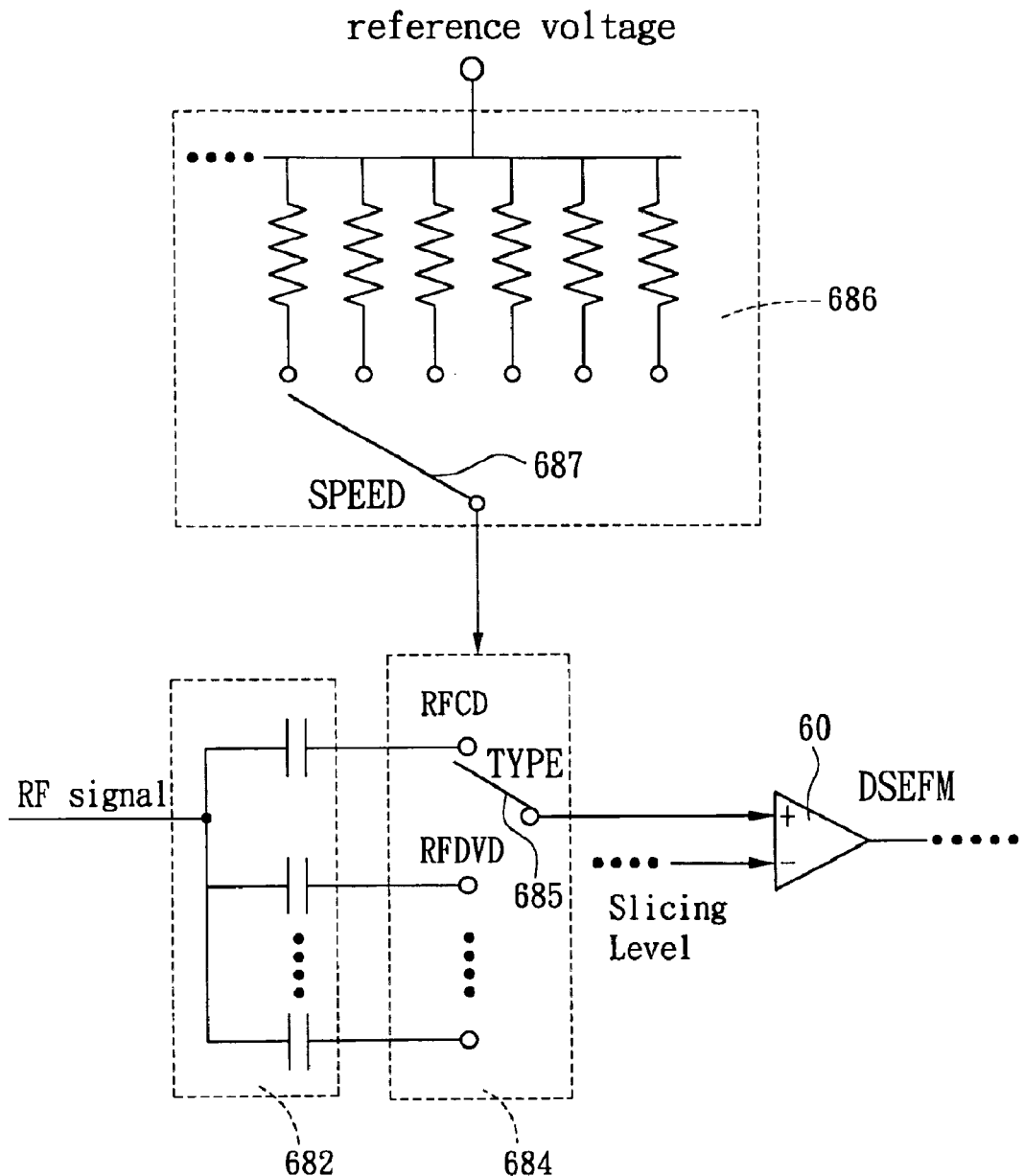
FIG. 4 shows circuits of o the high pass frequency selection circuit, the RF signal receiver and the disk signal selection circuit according to the embodiment of the invention.

The further description of the high pass frequency selection circuit 686 will be illustrated in the following with referring to FIG. 4. A high pass frequency selection circuit 686 is formed by a plurality of parallel-connected resistors. These resistors have a common terminal connected to a reference voltage (VREF) and the other terminal connected to a selecting switch 687 for selecting a resistor. A properly voltage-dropped reference level is outputted. The switch operation is based on a speed signal SPEED, which represents the operation speed of optical drive.

Besides, a further description about the RF signal receiver 682 and the disk signal selection circuit 684 will be illustrated in the following with reference to FIG. 4 again. The RF signal receiver 682 has an input and a plurality of outputs for distinct data signals. Moreover, parallel-connected capacitors are used to filter the input RF signals. Further, the disk signal selection circuit 684 mainly has a selecting switch 685 for processing the signal being filtered through the RF signal receiver 682 and the high pass frequency selection circuit 686 for switching the RF input signal compatible with CD format or DVD format. The switch selection is based on a signal TYPE, indicating format of disk, for example, CD, DVD, etc.

In summary, the aforesaid defect protecting circuit and method for data slicer provides gain-adjusting for slicing level so as to match the requirement of the defect detecting of a compact disk. Moreover, the defect detecting and gain adjusting can be made according to format of disks for avoiding errors in data.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A defect protection circuit for data slicer in an optical drive, comprising:

a defect detecting circuit for detecting a defect and then outputting a defect signal;

a gain control logic circuit for receiving the defect signal, and then outputting an gain select signal;

a high pass filter for receiving a reference voltage and a RF signal, and then outputting a high-pass filtered RF signal;

a comparator for receiving the high-pass filtered RF signal and a slice level and then outputting a modulation signal;

a current pump circuit for receiving the modulation signal and the gain select signal and then outputting a current pump signal; and a low pass filter for filtering the current pump signal and then outputting the slice level to the comparator.

2. The defect protection circuit for data slicer as claimed in claim 1, wherein the gain control logic circuit comprises:

a gain select circuit for receiving the defect signal and outputting the gain select signal; and a counter for receiving the defect signal and an external reference clock for counting when the gain select circuit to generate a different gain select signal.

3. The defect protection circuit for data slicer as claimed in claim 1, wherein the high pass filter includes:
   a RF signal receiver for receiving the RF signal;
   a high pass frequency selection circuit for receiving the reference voltage and outputting an reference value with respect to the reference voltage; and
   a disk signal selection circuit for receiving an output from the RF signal receiver and the reference value from this high pass frequency selection circuit, and outputting the high-pass filtered RF signal to the comparator.

4. The defect protection circuit for data slicer as claimed in claim 1, wherein the gain select signal makes operation speed of the data slicer to switch between different gains.

5. The defect protection circuit for data slicer as claimed in claim 1, wherein the RF signal receiver comprises a plurality of parallel capacitors.

6. The defect protection circuit for data slicer as claimed in claim 3, wherein the high pass frequency selection circuit is formed by a plurality of parallel-connected resistors with different resistance values.

7. The defect protection circuit for data slicer as claimed in claim 1, wherein the disk signal selection circuit couples one of the capacitors to the comparator according to a disk type signal.

* * * * *